United States Patent
Echigoya et al.

(10) Patent No.: US 7,517,576 B2
(45) Date of Patent: Apr. 14, 2009

(54) VACUUM INSULATION PANEL

(75) Inventors: Wataru Echigoya, Iwafune (JP);
Kuninari Araki, Itakura (JP); Tsuyoshi Kubota, Ohira (JP); Takashi Miseki, Ohira (JP)

(73) Assignee: Hitachi Appliances, Inc., Tokyo (JP)

( * ) Notice: Subject to any disclaimer, the term of this patent is extended or adjusted under 35 U.S.C. 154(b) by 269 days.

(21) Appl. No.: 11/246,521

(22) Filed: Oct. 11, 2005

(65) Prior Publication Data
US 2006/0076863 A1    Apr. 13, 2006

(30) Foreign Application Priority Data
Oct. 12, 2004    (JP)    ............................. 2004-297084

(51) Int. Cl.
*F16L 59/065*    (2006.01)
(52) U.S. Cl. ........................................ 428/69; 428/136
(58) Field of Classification Search .................. 428/69, 428/136

See application file for complete search history.

(56) References Cited

U.S. PATENT DOCUMENTS
5,330,816 A * 7/1994 Rusek, Jr. .................... 428/69

FOREIGN PATENT DOCUMENTS

| JP | 58-127085 | 7/1983 |
| JP | 04-337195 | 11/1992 |
| JP | 2002-048466 | 2/2002 |
| JP | 2004-003534 | 1/2004 |
| JP | 2004-3534 A | 1/2004 |
| JP | 2004-218746 A | 8/2004 |
| JP | 2004-218747 | 8/2004 |

* cited by examiner

*Primary Examiner*—Alexander Thomas
(74) *Attorney, Agent, or Firm*—Antonelli, Terry, Stout & Kraus, LLP.

(57) ABSTRACT

The invention provides a vacuum insulation panel to which moisture and gas do not easily adsorb while it is being processed or being in storage in an unfinished state. The vacuum insulation panel includes a core provided with air circulation, a getter material which adsorbs moisture and gas from the core, an inner film bag which accommodates the core and the getter material, and an outer barrier bag which accommodates the inner film bag. The getter material is filled in an incision provided on the surface of the core. To prevent the getter material from getting out of the incision, the opening of the incision is narrowed by evacuating air from the interior of the inner film bag and, concurrently, compressing the inner film bag and the core.

15 Claims, 6 Drawing Sheets

PRIOR ART

FIG. 7

VACUUM INSULATION PANEL

CLAIM OF PRIORITY

The present application claims priority from Japanese application serial JP 2004-297084 filed on Oct. 12, 2004, the content of which is hereby incorporated by reference into this application.

FIELD OF THE INVENTION

The present invention relates to a vacuum insulation panel, a refrigerator incorporating the same, and a method for producing the same.

BACKGROUND OF THE INVENTION

A vacuum insulation panel and a refrigerator using a vacuum insulation panel is disclosed in Japanese Patent Laid-Open No. 2004-3534. The vacuum insulation panel described in FIG. 1 and the specification of Japanese Patent Laid-Open No. 2004-3534 has a depressed portion for holding a getter material. The depressed portion is formed on a joint surface of at least one of plural boards made of inorganic fiber shaped by heating and pressurization. Such an arrangement is to prevent the getter material from projecting and damaging an outer cover of the vacuum insulation panel.

FIG. 1 and the specification of Japanese Patent Laid-Open No. 2002-48466 describe a vacuum insulation panel to be installed in space, where foam insulation material is also filled, formed by an outer box and an inner box. The vacuum insulation panel includes a getter material which adsorbs moisture and an envelope made of film having a gas-barrier characteristic. No fixed structure such as a fixed member or a depressed portion is used to hold the getter material. The getter material is held between sheet-shaped compacts of inorganic fiber used as core material. The getter material thus held does not move between compacts. It stays in a prescribed position during a process, for example, for air evacuation for producing a vacuum insulation panel, so that cost reduction can be promoted.

The vacuum insulation panel described in FIG. 1 and the specification of Japanese Patent Laid-Open No. 2004-218747 includes a core, a getter material, and an envelope accommodating the core and the getter material. The getter material is put in a depressed portion formed on the core. The envelope whose inner surface faces the getter material is made of a laminate film having an aluminum foil layer. A highly pierce-resistant protective sheet is placed between the getter material and the envelope to prevent the envelope from being punctured when it is vacuum-sealed.

The vacuum insulation panel described in FIG. 1 and the specification of Japanese Patent Laid-Open No. H4(1992)-337195 includes a container whose interior is kept in vacuum, an inorganic fiber mat put in the container, and an inner film bag which is used to temporarily place the inorganic fiber mat in a compressed state. This composition of the vacuum insulation panel is to prevent the vacuum insulation panel from getting wrinkled, warped or bent.

Patent Document 1: Japanese Patent Laid-Open No. 2004-3534

Patent Document 2: Japanese Patent Laid-Open No. 2002-48466

Patent Document 3: Japanese Patent Laid-Open No. 2004-218747

Patent Document 4: Japanese Patent Laid-Open No. H4(1992)-337195

It is known that, generally, a core to be used in a vacuum insulation panel is dried to remove moisture and gas from it before it is subjected to a process performed to evacuate air from it. This is done not to allow, even in a high degree of vacuum, moisture and gas to get out of the core and lower the degree of vacuum there. It is also well known that, to adsorb a very small amount of moisture and gas getting out of core material while the core is kept in a high degree of vacuum for a long period of time, a getter material such as a synthetic zeolite or activated carbon is put in the vacuum insulation panel. The core having been dried, therefore, requires to be put in a state, for example, in vacuum free of moisture and gas so as not to allow it to adsorb moisture and gas from outside.

The vacuum insulation panels described in Japanese Patent Laid-Open Nos. 2004-3534, 2002-48466, or 2004-218747 have one of a construction in which a getter material is accommodated between plural core boards, a construction in which a getter material is held between sheet-shaped compacts, and a construction in which a getter material is covered with a protective sheet. Producing the vacuum insulation panels therefore involves a process for accommodating the getter material, for holding the getter material, or for covering the getter material with a protective sheet. During the process, it is possible that the core composed of core boards or sheet-shaped compacts adsorbs moisture and gas from the outside air.

Figure 7:
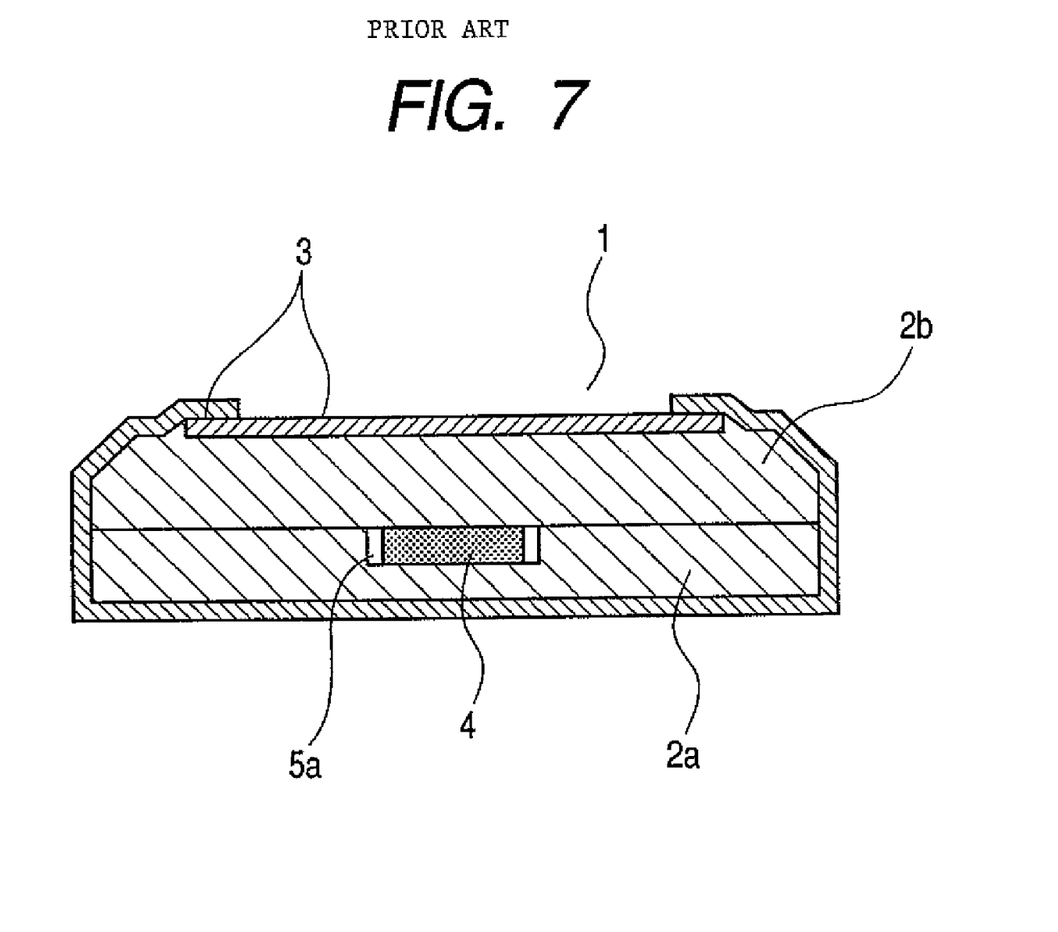
FIG. 7 is an explanatory cross-sectional view of a conventional vacuum insulation panel.

The problems as described above will be explained in more detail with reference to FIG. 7 showing an explanatory block diagram of a conventional vacuum insulation panel. Referring to FIG. 7, a vacuum insulation panel 1 includes plural core materials 2a and 2b, an envelope 3, and a getter material 4. A depressed portion 5a is formed approximately at a center of the joint surface between the core materials 2a and 2b. The getter material 4 is accommodated in the depressed portion 5a. The getter material 4 can be placed in the core by raising one side of the core material 2b and placing the getter material 4 in the depressed portion 5a. Or, it is necessary to remove the core material 2b, place the getter material 4 in the depressed portion 5a formed on the core material 2a, and put back the core material 2b to cover the getter material 4. In either way, to place the getter material 4 in the core takes time and, during the time, the core materials 2a and 2b possibly adsorb moisture and gas from the outside air.

How to concretely deal with the above problem is not proposed in any of the Japanese Patent Laid-Open Nos. 2004-3534, 2002-48466, and 2004-218747 in which conventional techniques are described.

When the above-described type of cores are to be used inside insulation walls of, for example, a refrigerator, it is necessary to prepare the cores in plural sizes according to the size of the refrigerator or according to the sizes, including the thicknesses, of the insulation walls. In such a situation, it becomes necessary during a production process to put unfinished cores in storage. As previously mentioned, however, the cores coming through a drying process require to be swiftly put in vacuum so as not to adsorb moisture and gas from outside. Hence, a production process for a vacuum insulation panel which includes a core constructed as described above is designed without much flexibility and room for adjustment.

How to concretely deal with the above problem is not proposed in any of the Japanese Patent Laid-Open Nos. 2004-3534, 2002-48466, and 2004-218747 in which conventional techniques are described.

In the Japanese Patent Laid-Open No. H4(1992)-337195 in which a conventional example is described, no concrete way to deal with the adsorption of moisture and gas from outside to the inorganic fiber mat put in the accommodating member is disclosed.

The present invention addresses the above problems with conventional vacuum insulation panels. It aims to reduce the adsorption of moisture and gas from outside to core materials while they are in a production process or in storage in an unfinished state.

SUMMARY OF THE INVENTION

To achieve the above aim, the present invention provides a vacuum insulation panel which includes a core made of an inorganic fiber assembly, a getter material which adsorbs moisture and gas from the core, and an outer barrier bag which accommodates the core and the getter material. In the vacuum insulation panel, the getter material is held in an incision provided on a surface of the core, and the core is configured, using an inorganic fiber laminate containing no binder, such that an opening of the incision is narrowed after the getter material is accommodated.

The present invention can also provide a vacuum insulation panel which includes a core made of an inorganic fiber assembly, a getter material which adsorbs moisture and gas from the core, an inner film bag which accommodates the core, and an outer barrier bag which accommodates the inner film bag. In the vacuum insulation panel, the getter material is held in an incision provided on a surface of the core, and an opening of the incision is narrowed by evacuating air from an interior of the inner film bag and compressing the inner film bag and the core. The vacuum insulation panel enables the time needed for getter material setting work to be reduced. Therefore, its core can be prevented from easily adsorbing moisture and gas from outside.

The present invention can also provide a vacuum insulation panel which includes a core provided with air circulation, a getter material which adsorbs moisture and gas from the core, an inner film bag which accommodates the core and the getter material, and an outer barrier bag which accommodates the inner film bag. In the vacuum insulation panel, the getter material is filled in an incision provided on a surface of the core, and an opening of the incision is, to prevent the getter material from getting out of the opening, narrowed by evacuating air from an interior of the inner film bag and compressing the inner film bag and the core. The vacuum insulation panel enables the time needed for getter material setting work to be reduced. Therefore, its core can be prevented from easily adsorbing moisture and gas from outside. Since its core is provided with air circulation, the getter material is subjected to good air circulation. Therefore, moisture and gas in the inner film bag can be adsorbed with a high adsorption rate.

The core put in the inner film bag can be put in storage as it is, so that unfinished products in a production line can be put in storage with ease. The vacuum insulation panel can, therefore, increase work process flexibility and improve overall production efficiency. Since only a very small amount of moisture and gas adsorbs to the core from outside, the time needed to evacuate air from inside the core to put the core in a high degree of vacuum can be reduced. This makes the vacuum insulation panel advantageous in terms of production cost. Since the core is provided with air circulation, the getter material is subjected to good air circulation. Therefore, moisture and gas in the inner film bag can be adsorbed with a high adsorption rate, and a high degree of vacuum can be maintained for a long period of time. Thus, the vacuum insulation panel can maintain high heat insulation performance for a long period of time, making it advantageous in terms of energy saving.

The present invention can provide a refrigerator which includes an outer plate, an inner plate, a vacuum insulation panel which is installed in one of a position toward the outer plate and a position toward the inner plate in space formed between the outer plate and the inner plate, and foam insulation material filled in the space excluding the space occupied by the vacuum insulation panel. In the refrigerator, the vacuum insulation panel include a core provided with air circulation, a getter material which adsorbs moisture and gas from the core, an inner film bag which accommodates the core and the getter material, and an outer barrier bag which accommodates the inner film bag. The getter material is filled in an incision provided on a surface of the core. The core is then compressed to cause an opening of the incision to be narrowed so as to prevent the getter material from getting out of the incision. In this way, the time needed for getter material setting work can be reduced and, therefore, moisture and gas do not easily adsorb to the core from outside. This makes it possible to maintain a high degree of vacuum for a long period of time. Thus, the vacuum insulation panel used in the refrigerator can maintain good heat insulation performance for a long period of time. The core put in the inner film bag can be put in storage as it is, so that unfinished products in a production line can be put in storage with ease. The refrigerator can, therefore, increase work process flexibility and improve overall production efficiency.

The present invention can provide a vacuum insulation panel which includes a core provided with air circulation, a getter material which adsorbs moisture and gas from the core, and a double-layered bag which has an inner film bag and an outer barrier bag for covering the core and the getter material. In the vacuum insulation panel, the getter material is filled in a getter material holding section provided in the core before the core is covered with the inner film bag. The core and the inner film bag in which the core is put are then compressed to cause an inlet of the getter material holding section to be narrowed so as to prevent the getter material from getting out of the getter material holding section. In this way, the time needed for getter material setting work can be reduced and, therefore, moisture and gas do not easily adsorb to the core from outside. Thus, the vacuum insulation panel can maintain a high degree of vacuum for a long period of time. Since the core is provided with air circulation, the getter material is subjected to good air circulation. Therefore, moisture and gas in the inner film bag can be adsorbed with a high adsorption rate, and a high degree of vacuum can be maintained for a long period of time. Thus, the vacuum insulation panel can maintain high heat insulation performance for a long period of time, making it advantageous in terms of energy saving.

As described above, according to the present invention, the time needed for getter material setting work can be reduced and a vacuum insulation panel with a core to which moisture and gas do not easily adsorb can be provided.

Also, according to the present invention, the core can be put in storage in a state of being put in an inner film bag from which air has been evacuated and which has been compressed. Therefore, moisture and gas do not easily adsorb to the core, and unfinished products in a production line can be put in storage with ease. A refrigerator can therefore be provided which can increase work process flexibility and improve overall production efficiency.

Also, according to the present invention, the core is provided with air circulation, so that the getter material is subjected to good air circulation. Therefore, moisture and gas in the inner film bag can be adsorbed with a high adsorption rate, and a high degree of vacuum can be maintained for a long period of time. Thus, the present invention can provide a vacuum insulation panel which can maintain high heat insulation performance for a long period of time, making it advantageous in terms of energy saving, a refrigerator using the vacuum insulation panel, and a method for producing the vacuum insulation panel.

DETAILED DESCRIPTION OF THE PREFERRED EMBODIMENTS

Embodiments of the present invention will be described in the following with reference to the accompanying drawings.

First Embodiment

Figure 1:
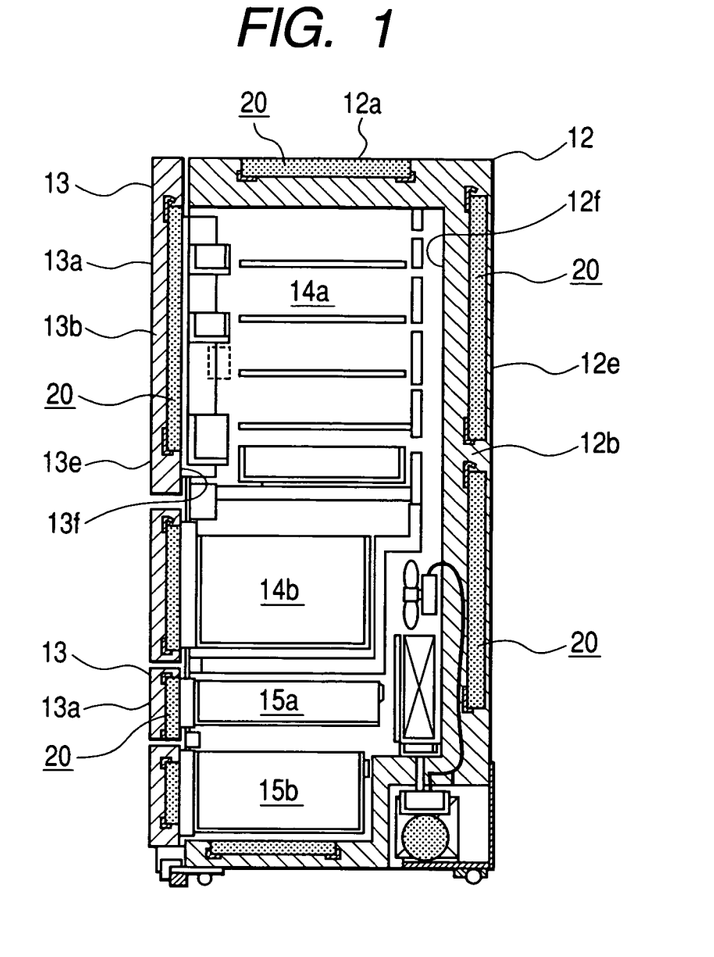
FIG. 1 is a vertical sectional view of principal parts of a refrigerator according to an embodiment of the present invention.
Figure 2:
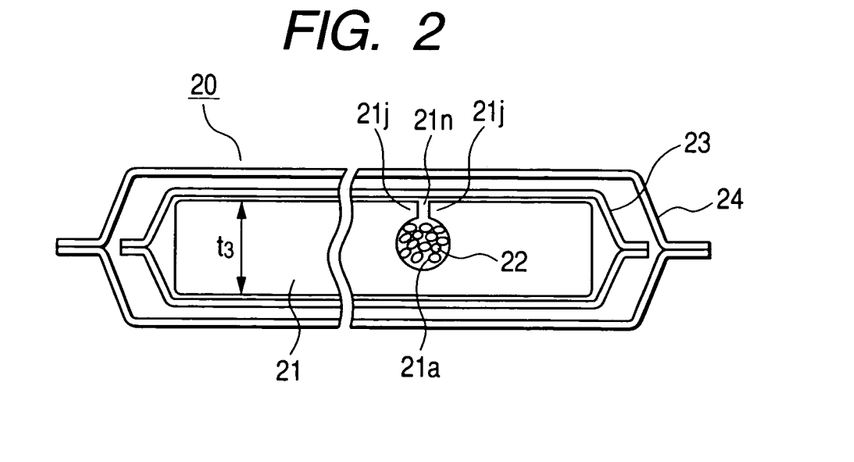
FIG. 2 is an explanatory cross-sectional view of a vacuum insulation panel according to a first embodiment of the present invention.

An embodiment of the present invention will be described in the following with reference to drawings. FIG. 1 is a vertical sectional view of principal parts of a refrigerator according to an embodiment of the present invention. FIG. 2 is an explanatory cross-sectional view of a vacuum insulation panel according to a first embodiment of the present invention. As shown in FIG. 1, a frame 12 of the refrigerator is provided with plural doors 13 which can open and close openings of the frame 12. In the frame 12, there are a chill compartment 14a, a vegetable compartment 14b, an ice compartment 15a, and a freezer compartment 15b. An insulation wall 12a of the frame 12 of the refrigerator is provided with vacuum insulation panels 20 being described later. The vacuum insulation panels 20 are set in space formed between an outer plate 12e and an inner plate 12f of the frame 12. In the space, they are disposed toward the outer plate 12e or toward the inner plate 12f. A foam insulation 12b made of, for example, adhesive urethane is filled in space around each of the vacuum insulation panels 20. The foam insulation 12b by serving to fix the vacuum insulation panels 20 in place enables the insulation wall 12a to keep its shape.

An insulation wall 13a of each of the doors 13 is provided with one of the vacuum insulation panels 20. The vacuum insulation panel 20, being described later, provided for the insulation wall 13a is set in space formed by an outer plate 13e and an inner plate 13f of the door. In the space, the vacuum insulation panel 20 is disposed toward the outer plate 13e or toward the inner plate 13f. A foam insulation 13b made of, for example, adhesive urethane is filled in space around the vacuum insulation panel 20. The foam insulation 13b by serving to fix the vacuum insulation panel 20 in place enables the insulation wall 13a to keep its shape. The vacuum insulation panels 20 being disposed in the insulation walls 12a and 13a have higher heat insulation performance than the foam insulation made of, for example, urethane. It is composed as shown in FIG. 2.

Next, with reference to FIG. 2, an embodiment of the vacuum insulation panel according to the first embodiment of the present invention will be described. In FIG. 2, a core 21 provided with air circulation has been shaped into a prescribed size. It is made of inorganic fiber, for example, a binderless glass wool laminate (JIS A9504: Man made mineral fiber thermal insulation materials) with an average fiber diameter of 4 μm. A getter material 22 is for adsorbing moisture and gas contained in the core 21. It may be, for example, molecular sieve 13x which is a synthetic zeolite. It is filled in a getter material holding section 21a provided in the core 21. A portion 21j forming a narrow inlet of the getter material holding section 21a is for preventing the getter material 22 filled in the getter material holding section 21a from getting out of there. It is formed, after the core 21 is put in an inner film bag 23 being described later, by evacuating air from the inner film bag 23 and, concurrently, compressing the inner film bag 23 containing the core 21. The inner film bag 23 is for accommodating the core 21 in which the getter material 22 is filled. After the core 21 is accommodated in it, it is used to evacuate air from and compress the core 21. Namely, the inlet formed by the portion 21j of the getter material holding section 21a is narrowed when the core 21 put in the inner film bag 23 is deaired and compressed. In other words, the getter material 22 is filled in the getter material holding section 21a through an opening 21n and then, after the core 21 is put in the inner film bag 23, the inner film bag 23 is deaired and, simultaneously, compressed so as to cause the opening 21n to be narrowed.

The inner film bag 23 is made of heat-weldable synthetic resin film having a short-term gas-barrier characteristic, for example, high-density polyethylene resin. Therefore, it is not infiltrated by moisture or gas from outside. To be more concrete, the core 21 and the getter material 22 easily adsorb moisture and gas contained in the air. The getter material 22 in particular is designed to adsorb moisture and gas relatively quickly and intensively from around itself. Not to allow the core 21 and the getter material 22 to adsorb moisture and gas from outside while they are in a production line, for example, for assembly work or while they are in temporary storage as unfinished products, they are put in the inner film bag 23 that has a gas-barrier characteristic. An outer barrier bag 24 is for covering the inner film bag 23. It is made of laminate film having a long-lasting gas-barrier characteristic. The long-lasting gas-barrier characteristic of the outer barrier bag 24 refers to a gas-barrier characteristic that lasts approximately as long as an average operating life of refrigerators. The degree of vacuum of the outer barrier bag 24, however, drops gradually.

Figure 3:
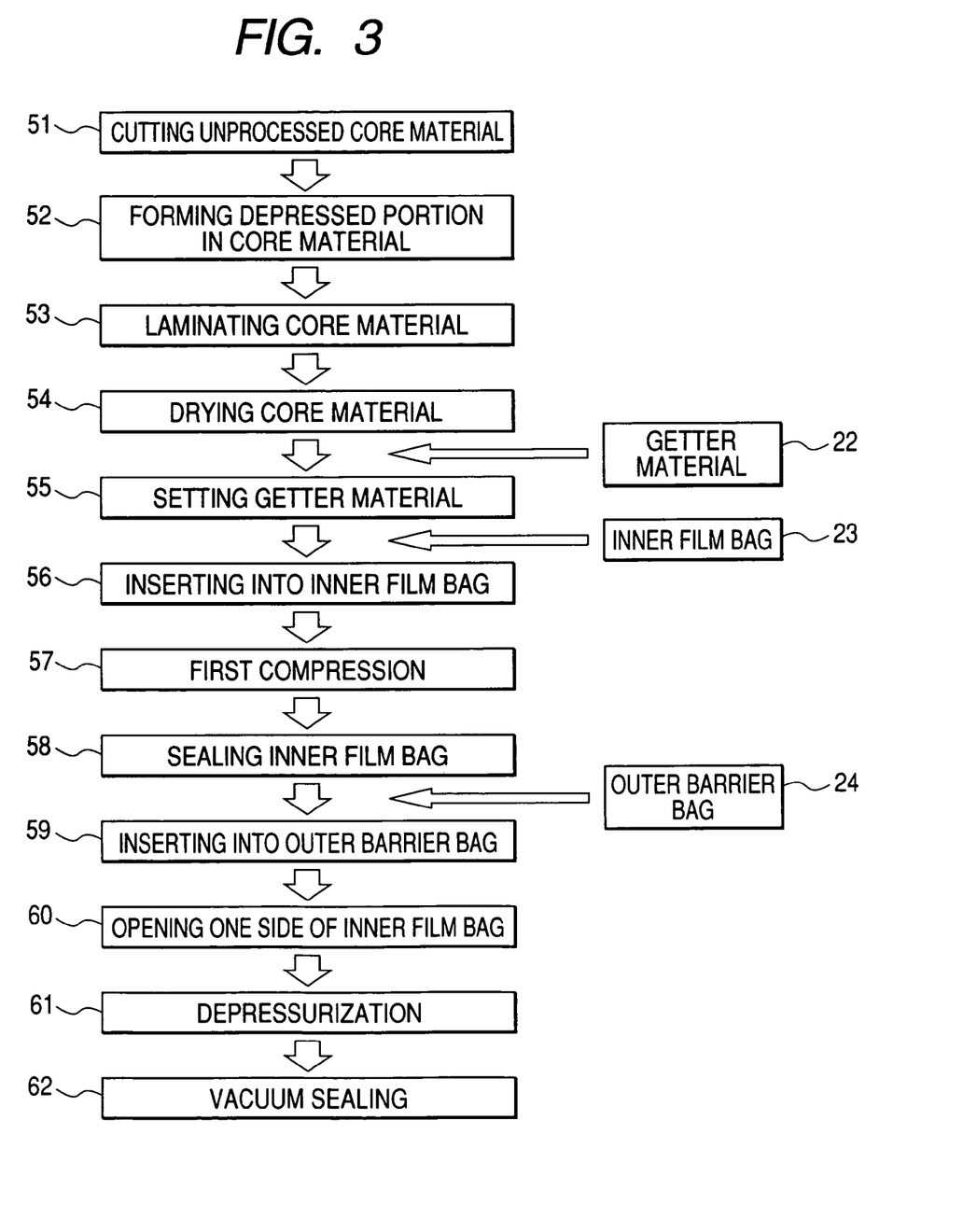
FIG. 3 is an explanatory diagram showing a production process for a vacuum insulation panel according to an embodiment of the present invention.
Figure 4A:
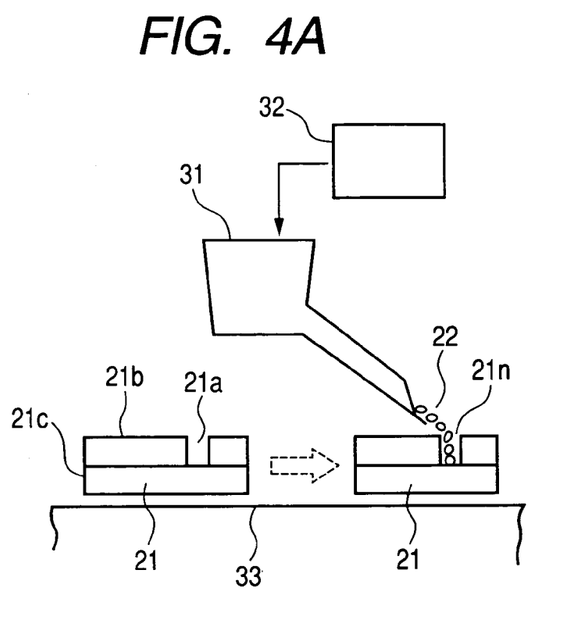
FIGS. 4A to 4D are explanatory diagrams showing processes for producing a core and an inner film bag according to an embodiment of the present invention.
Figure 4B:
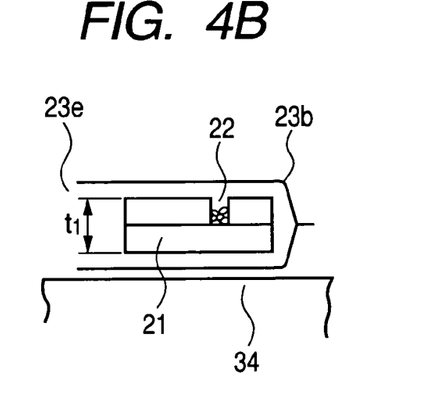
Figure 4C:
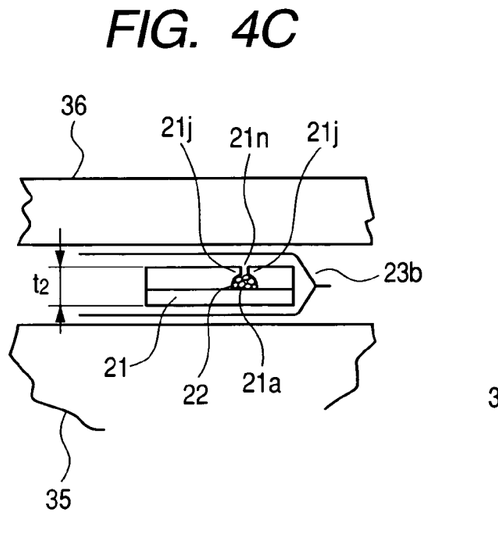
Figure 4D:
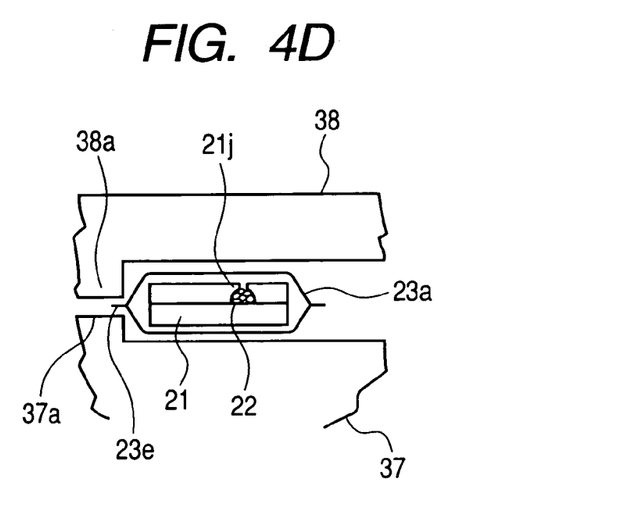

Next, FIG. 3 to FIG. 4D will be explained. FIG. 3 is an explanatory diagram showing a production process for a vacuum insulation panel according to an embodiment of the present invention. FIGS. 4A to 4D are explanatory diagrams showing processes for producing a core and an inner film bag according to an embodiment of the present invention. In FIGS. 4A to 4D, parts which are the same as those shown in FIG. 1 or 2 are denoted by the same reference numerals as in FIG. 1 or 2, and their detailed description is omitted in the following.

First, referring to FIG. 3, in a step 51 for cutting unprocessed core material, inorganic fiber core material such as a glass wool laminate is cut into a prescribed size. In a step 52 for forming a depressed portion in the core material, a depressed portion or an incision for holding the getter material 22 (22 in FIG. 2) is formed in a prescribed position which comes into contact with the inner surface of the inner film bag 23 (23 in FIG. 2). In a step 53 for laminating the core material, a prescribed number of sheets of the core material are laminated. In a step 54 for drying the core material, the core material is put in a drying furnace at a temperature of, for example, 200 to 250° C., and moisture and gas components of the core material are removed.

Steps 55, 56, 57, and 58 are respectively for setting a getter material, for insertion into an inner film bag, for first compression, and for sealing the inner film bag. These steps 55 to 58 will be explained in detail later with reference to FIGS. 4A to 4D. In a step 59 for insertion into an outer barrier bag, the inner film bag sealed in the step 58 for sealing the inner film bag is inserted in an outer barrier bag. In a step 60 for opening one side of the inner film bag, one side of the inner film bag inserted in the outer barrier bag is opened to enable air to be evacuated from the inner film bag. In a step 61 for air evacuation, air is evacuated from the interiors of the inner film bag and the outer barrier bag until a prescribed degree of vacuum is achieved. In this step, the core material is deaired and, concurrently, compressed. The compression force applied to the core material in this step is larger than that applied in the step 57 for first compression. By evacuating air from the interior of the outer barrier bag and, concurrently, compressing the core material, a high degree of vacuum is achieved. What is done in this step is, therefore, a combination of a second compression and depressurization. In a step 62 for vacuum sealing, the outer barrier bag from which air has been evacuated is sealed.

Next, FIGS. 4A to 4D will be explained. FIG. 4A shows an example of the step for getter material setting. In the step, the getter material 22 is automatically filled in the prescribed position 21a of the core 21. A conveyor 33 carries the core 21 placed on it. A getter material filling device 31 automatically fills the getter material 22 in the prescribed position 21a of the core 21 placed on the conveyor 33. The getter material filling device 31 is controlled by a filling control device 32. The core 21 has two inorganic fiber portions 21b and 21c each made of, for example, a glass wool laminate. The surface of a laminate 21b making up an external surface of the inorganic fiber laminate has the prescribed position 21a where an incision or a depressed portion is formed.

Next, FIG. 4B will be explained. FIG. 4B shows an example of the step for insertion into an inner film bag. In the step, the core 21 is put in the inner film bag 23b. The core 21 is made of inorganic fiber such as a glass wool laminate in which the getter material 22 has been set. A conveyor 34 is arranged so as to insert the core 21 in the inner film bag 23b having an opening 23e produced by a device, not shown.

Next, FIG. 4C will be explained. FIG. 4C shows the step for first compression. In the step, the core 21 and the getter material 22 are compressed into a prescribed size while air is evacuated from the interior of the inner film bag 23b. The compression device shown in FIG. 4C has a lower plate 35 and an upper plate 36. The core 21 covered with the inner film bag 23b and placed on the lower plate 35 is compressed by the upper plate 36 until its thickness is 't$_2$' as prescribed. When the core 21 is compressed until it has a prescribed thickness t$_2$, the portion 21j that is, as described with reference to FIG. 2, designed to narrow, by means of the core material itself, the inlet of the getter material holding section 21a is narrowed and, as a result, the opening 21n of the getter material holding section 21a is closed.

The prescribed thickness t$_2$ represents a thickness which allows the inner film bag 23b to be inserted in the outer barrier bag 24 (24 in FIG. 2) without difficulty. It is, for example, about 1.5 to 3 times the thickness t$_3$ shown in FIG. 2. In other words, when the core material having a thickness t$_1$ shown in FIG. 4B cannot be easily inserted in the outer barrier bag 24 (24 in FIG. 2), the core material is compressed to have its thickness reduced from t$_1$ to t$_2$.

The core material thickness t$_2$ to be obtained by the first compression has been determined such that, even when the core material is processed for recycling, its fiber assembly is strong enough not to break down.

Next, FIG. 4D will be explained. FIG. 4D shows the step for inner film bag sealing. In the step, the opening 23e of the inner film bag 23b shaped by having the core material thickness reduced to t2 is sealed. A bag sealing device shown in FIG. 4D has a lower plate 37 and an upper plate 38. The inner film bag 23b placed on the lower plate 37 is sealed by having its opening 23e heat-welded by the heat-welding plates 37a and 38a of the lower plate 37 and the upper plate 38, respectively. In this arrangement, when the inner film bag 23b is sealed, the core 21 and the getter material 22 placed in the inner film bag 23b are completely isolated from the outside air. Also, as a result of the sealing of the inner film bag 23b, the state of the portion 21j narrowing, as described with reference to FIG. 4C, the inlet of the getter material holding section is maintained.

As described above, according to the present invention, an getter material is filled in a getter material holding section formed in a core material which is provided with air circulation. Subsequently, to prevent the getter material from getting out of the getter material holding section, air is evacuated from the inner film bag in which the core material is put and, concurrently, the inner film bag and the core material are compressed. This causes the core material to spread in directions perpendicular to the direction of compression thereby narrowing the inlet of the getter material holding section. In this way, the time needed for getter material setting work can be reduced. As a result, a vacuum insulation panel with a core to which moisture and gas do not easily adsorb from outside can be provided.

Also, the inner film bag accommodating a core can be put in storage as it is, so that unfinished products in a production line can be easily put in storage. This increases flexibility in operation processes. Thus, a vacuum insulation panel can be provided which enables overall production efficiency to be improved. Furthermore, only a very little amount of moisture and gas adsorbs to the core from outside, so that the time needed to evacuate air from inside the core can be reduced. Thus, a vacuum insulation panel can be provided which is advantageous in terms of production cost.

A core provided with air circulation is used, so that the getter material used is subjected to good air circulation. As a result, moisture and gas in the inner film bag can be adsorbed with a high adsorption rate, so that a high degree of vacuum can be maintained for a long period of time. Thus, a vacuum insulation panel which can maintain high heat insulation performance for a long period of time to promote energy saving and a refrigerator incorporating the vacuum insulation panel can be provided.

Second Embodiment

Figure 5A:
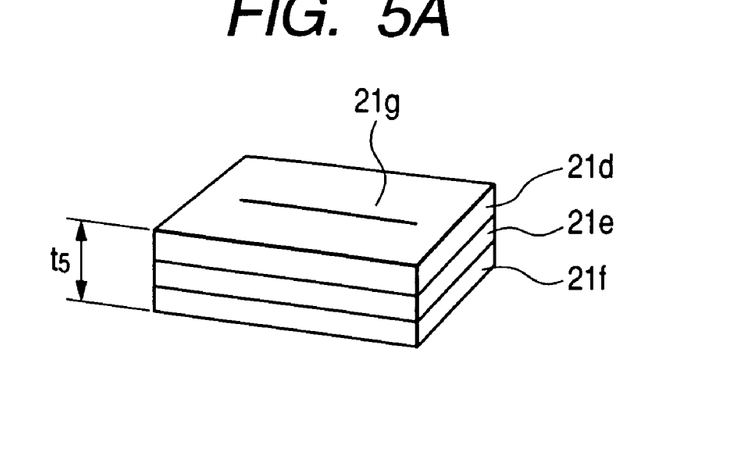
FIGS. 5A to 5C are explanatory diagrams showing core material processing according to a second embodiment of the present invention.
Figure 5B:
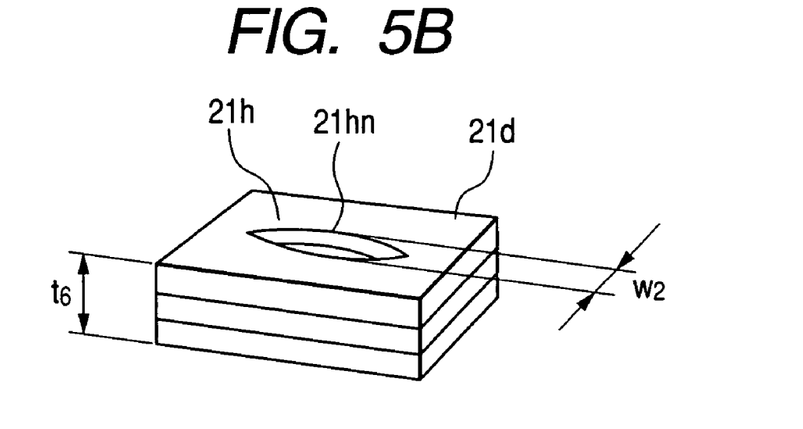
Figure 5C:
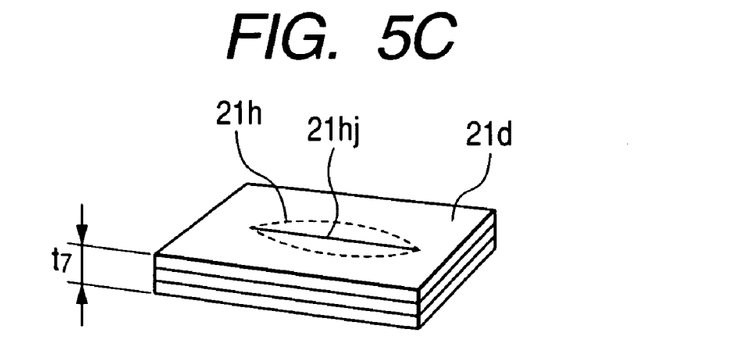

Next a second embodiment of the present invention will be explained with reference to FIGS. 5A to 5C. FIGS. 5A to 5C are explanatory diagrams showing core material processing according to the second embodiment of the present invention. FIG. 5A is a diagram for explaining first processing. FIG. 5B is a diagram for explaining second processing performed on the core material coming through the first processing shown in FIG. 5A. FIG. 5C is a diagram for explaining third processing performed on the core material coming through the second processing shown in FIG. 5B. It is a perspective view of a core material itself having undergone first compression, as being described later, in a process equivalent to the one illustrated in FIG. 4C. First, referring to FIG. 5A, reference numerals 21d, 21e, and 21f represent three layers of inorganic fiber core material provided with air circulation, with each layer shaped in a prescribed size and the three layers laminated as shown. The inorganic fiber core material elastically transforms with changes in absolute pressure. An incision 21g in which a getter material, being described later, is to be filled is provided on the surface of the core material 21d that makes up an outer surface of the core material laminate.

Next, as shown in FIG. 5B, the incision 21g is widened, for example, using a widening device (not shown) to form a groove 21h looking approximately like a circular arch and having a width w2. The getter material 22 (22 in FIG. 4) is automatically filled in the groove 21h through an opening 21hn using a device equivalent to the getter material filling device 31 explained with reference to FIG. 4A. Then in a process equivalent to the step for insertion into an inner film bag previously described with reference to FIG. 4B, the core material is inserted in the inner film bag 23b. Subsequently, in a process equivalent to the step for first compression previously described with reference to FIG. 4C, a portion 21hj designed to narrow the opening 21hn is formed as shown in FIG. 5C.

When, after the getter material is filled in the widened groove 21h through the opening 21hn, the widening device is removed from the widened groove 21h, the portion 21hj of the opening 21hn designed to narrow the opening inlet as shown in FIG. 5C is formed to some extent by virtue of the elastic resilience of the core material. Subsequently, when the core material is subjected to a process equivalent to the previously described step for first compression in which air is evacuated from the interior of the inner film bag and, concurrently, the inner film bag and the core material accommodated in it are compressed, the core material spreads in directions perpendicular to the direction of compression. As a result, the portion 21hj for narrowing the inlet of the getter material holding section is completely formed.

To maintain the portion 21hj shaped to narrow the inlet of the groove 21h in which the getter material has been filled, the outer barrier bag accommodating the inner film bag is sealed in a process equivalent to the step for sealing the inner film bag previously described with reference to FIG. 4D.

The core material thickness $t_5$ shown in FIG. 5A is equivalent to $t_1$ shown in FIG. 4B. The core material thickness $t_7$ shown in FIG. 5C is equivalent to $t_2$ shown in FIG. 4C. It is desirable that the core material thickness $t_6$ shown in FIG. 5B be set to be between the $t_5$ and $t_7$ making use of the widening device.

According to the second embodiment of the present invention described above, the groove 21h is formed on the surface of the core material provided with air circulation. A getter material is set in the groove 21h. To prevent the getter material from getting out of the groove 21h, the portion 21hj designed to narrow the inlet of the groove 21h is formed as part of the core material. This enables the time needed to set the getter material to be reduced. Thus, a vacuum insulation panel with a core to which moisture and gas do not easily adsorb from outside can be provided.

Also, the incision 21g to be made a getter material holding section can be processed with ease. Therefore, a vacuum insulation panel which is advantageous in terms of production cost can be provided.

Since a core provided with air circulation is used, the time needed to evacuate air from inside the core can be reduced. Thus, a vacuum insulation panel which is advantageous in terms of production cost can be provided. Also, since a core provided with air circulation is used, the getter material is subjected to good air circulation. As a result, moisture and gas in the inner film bag can be adsorbed with a high adsorption rate, so that a high degree of vacuum can be maintained for a long period of time. Thus, a vacuum insulation panel can be provided which can maintain high heat insulation performance for a long period of time to promote energy saving.

Third Embodiment

Figure 6A:
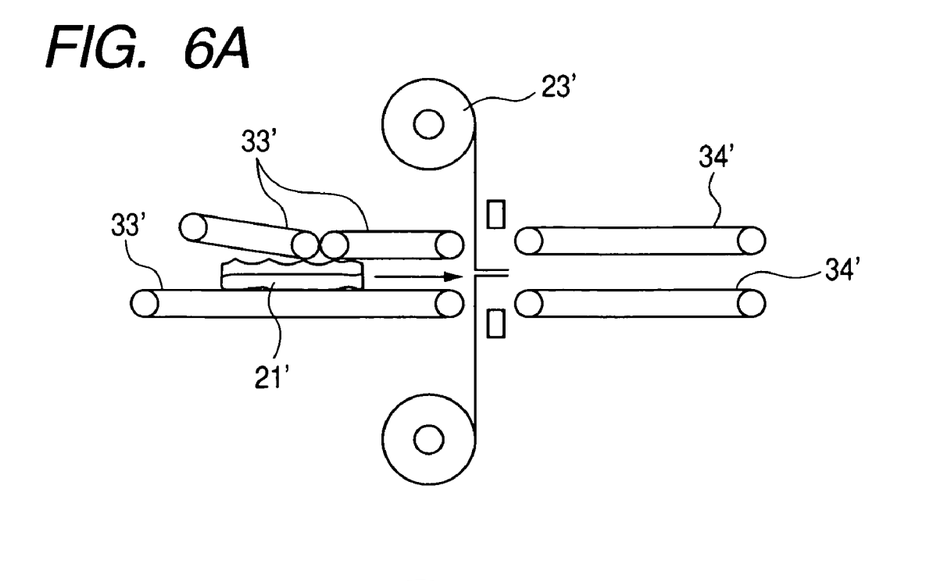
FIGS. 6A to 6C are explanatory diagrams showing processes for producing a core and an inner film bag according to a third embodiment of the present invention.
Figure 6B:
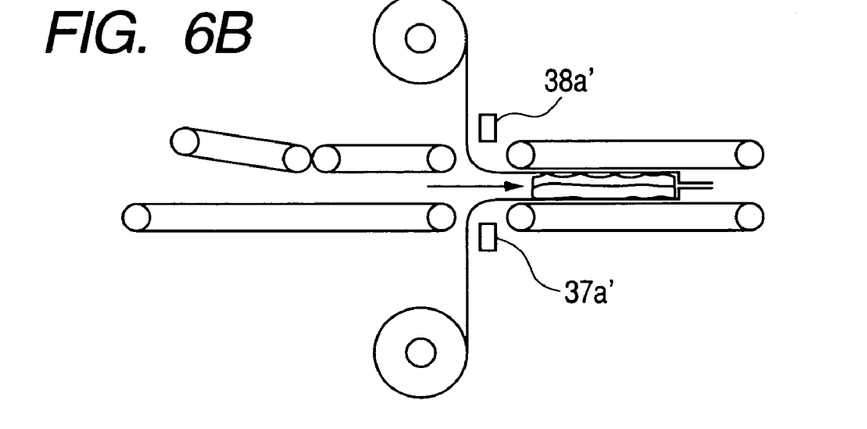
Figure 6C:
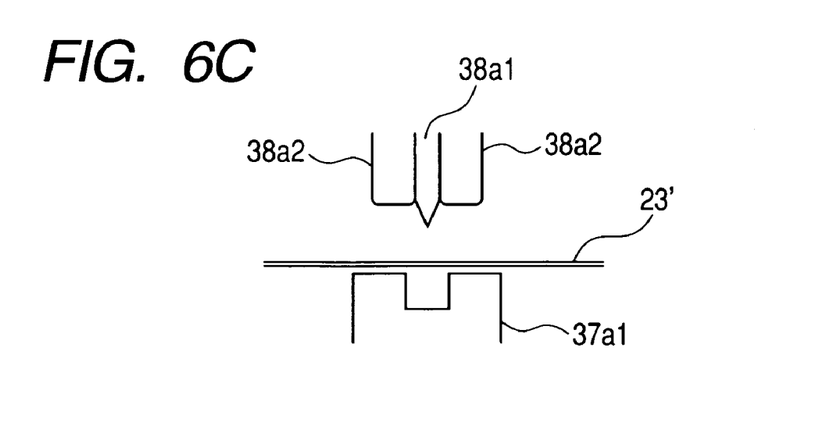

Next, a third embodiment of the present invention will be explained with reference to FIGS. 6A to 6C. FIGS. 6A to 6C are explanatory diagrams showing core material and inner film bag processing according to the third embodiment of the present invention. This embodiment is an example in which the step 56 for insertion into an inner film bag, the step 57 for first compression and the step 58 for sealing the inner film bag are combined.

An inorganic fiber assembly 21' to be made a core of a vacuum insulation panel is carried by a conveyor 33' in a state of being placed between an upper portion and a lower portion of the conveyer. The distance between the upper portion and the lower portion of the conveyor 33' is greater on the upstream side than on the downstream side of the conveyer. The inorganic fiber assembly 21' is, therefore, caused to be vertically compressed while being carried by the conveyor 33'. When the inorganic fiber assembly 21' carried in the direction shown by an arrow in FIG. 6A reaches a prescribed position, it is inserted in an inner film bag.

How the inorganic fiber assembly 21' is inserted in the inner film bag will be described with reference to FIGS. 6A and 6B. In the present embodiment, the inorganic fiber assembly 21' is inserted in an inner film bag by being carried toward a film for inner film bag 23' which is stretched in the vertical direction in a manner to block the conveyance path along which the inorganic fiber assembly 21' is carried.

In FIG. 6A, the film for inner film bag 23' rolled in a position higher than the upper and lower portions of the upstream conveyor 33' and the film for inner film bag 23' rolled in a position lower than the upper and lower portions of the upstream conveyor 33' are shown in a state in which they have been heat-welded to each other and in which their heat-welded portion is positioned on the conveyance path for the inorganic fiber assembly 21'. Namely, FIG. 6A shows a standby state for insertion into an inner film bag.

The distance between the upper and lower portions of the upstream conveyor 33' is greater toward the upstream end than toward the downstream end. The inorganic fiber assembly 21' is therefore carried while being compressed before abutting against the film for inner film bag 23' positioned on the conveyance path. The distance between the upper and lower portions of the downstream conveyor 34' is approximately the same as the distance between the upper and lower portions of a downstream half section of the upstream conveyor 33'.

Starting in the standby state as shown in FIG. 6A, the inorganic fiber assembly 21' is carried in the direction of the arrow shown in FIG. 6A while being compressed by the upper and lower portions of the upstream conveyor 33' until it abuts against the film for inner film bag 23' positioned as to block the conveyance path. After abutting against the film for inner film bag 23', the inorganic fiber assembly 21' continues to be carried by the conveyor 33' in the same direction. As a result, the inorganic fiber assembly 21' comes to be carried by the downstream conveyor 34' together with the film for inner film bag 23', and the inorganic fiber assembly 21' is inserted in the film for inner film bag 23'. According to the present embodiment, the heat-welded portion of the film for inner film bag 23' is, in the standby state, positioned on the conveyance path for the inorganic fiber assembly 21'. The heat-welded portion of the film for inner film bag 23' is therefore prevented from being broken apart by coming into contact with the upper and lower portions of the downstream conveyor 34'.

When the inorganic fiber assembly 21' and the film for inner film bag 23' are further carried toward the downstream, the film for inner film bag 23' is cut by an inner film bag film cutter and the portion thus cut of the film for inner film bag 23' is heat-welded by a heat-sealer. According to the present embodiment, cut-and-seal devices 37a' and 38a', which can function both as a cutter and a heat-sealer, are installed in a position which is between the upstream conveyor 33' and the downstream conveyor 34' and which is upstream of where the film for inner film bag 23' is positioned in the standby state (see FIG. 6A).

FIG. 6C is a diagram showing the makeup of the cut-and-seal devices. Cutter 38a1 and heat-sealer 38a2 are positioned above two sheets of the film for inner film bag 23' positioned on the conveyance path. The cutter 38a1 makes heat-cutting. Two portions of the heat sealer 38a2 are positioned as to sandwich the cutter 38a1 from the upstream and downstream sides as shown in FIG. 6C. The heat sealer 38a2 may be, for example, a heating bar which heat-welds two sheets of the film for inner film bag 23'.

The cutter 38a1 is projecting below the heat-sealer 38a2, the two portions of which are positioned on the upstream and downstream sides of the cutter 38a1, respectively. When the cut-and-seal device 38a' (see FIG. 6B) is moved downward, the film for inner film bag 23' is cut and, on both sides of its portion thus cut, it is heat-welded. The cut-and-seal device 37a' positioned to oppose the cut-and-seal device 38a' makes up a receiver 37a1 for the heat-sealer 38a2. The concave portion of the receiver 37a1 is designed to accommodate the projecting portion of the cutter 38a1 without coming in contact with it. This is to secure that the heat-sealer 38a2 and the receiver 371a come in contact with each other via two sheets of the film for inner film bag 23' thereby allowing the two sheets of the film for inner film bag 23' to be heat-welded securely.

Heat-welding the two sheets of the film for inner film bag 23' at a position upstream of where they are cut results in forming an inner film bag in which the inorganic fiber assembly 21' is put. Also, since the inorganic fiber assembly 21' is carried by the conveyor while being compressed by the upper and lower portions of the conveyor, the interior of the inner film bag is compressed and air is evacuated from it before the inner film bag is heat-welded. The two sheets of the film for inner film bag 23' are also heat-welded at a position downstream of where they are cut, so that the standby state as shown in FIG. 6A is restored and, therefore, another of the inorganic fiber assembly 21' to come in next can also be subjected to the same process. In this way, the process of inserting the inorganic fiber assembly 21' in an inner film bag, evacuating air from the interior of the inner film bag, and sealing the inner film bag can be performed successively to improve production process efficiency.

What is claimed is:

1. A vacuum insulation panel, comprising:
   a core made of an inorganic fiber assembly,
   a getter material which adsorbs moisture and gas from the core, and
   an outer barrier bag which accommodates the core and the getter material, wherein;
   the core has only one vertical incision that linearly extends on the widest surface of the core and is cut to a depth and a length capable of holding the getter material,
   the getter material is held in the vertical incision, and
   the core is configured, using an inorganic fiber laminate containing no binder, such that an opening of the vertical incision is compressed so as to be narrowed in a state where the getter material is accommodated.

2. The vacuum insulation panel according to claim 1, wherein the opening of the vertical incision extends from the widest surface of the core toward an interior of the core.

3. The vacuum insulation panel according to claim 1, wherein the core has a pair of opposed major surfaces and the vertical incision is provided on one of the opposed major surfaces of the core such that the opening extends from the one of the opposed major surfaces of the core toward an interior of the core.

4. The vacuum insulation panel according to claim 1, wherein the core comprises an inorganic fiber layer with the vertical incision in a thickness direction and an inorganic fiber layer without the vertical incision, and
   the vertical incision passes through one side to the other side of the inorganic fiber layer with the vertical incision.

5. The vacuum insulation panel according to claim 1, wherein the getter material comprises a plurality of particles.

6. A vacuum insulation panel, comprising:
   a core made of an inorganic fiber assembly,
   a getter material which adsorbs moisture and gas from the core,
   an inner film bag which accommodates the core, and
   an outer barrier bag which accommodates the inner film bag, wherein;
   the core has only one vertical incision that linearly extends on the widest surface of the core and is cut to a depth and a length capable of holding the getter material,
   the getter material is held in the vertical incision, and
   an opening of the incision is narrowed by evacuating air from an interior of the inner film bag and compressing the inner film bag and the core in the state where the getter material is accommodated.

7. The vacuum insulation panel according to claim 6, wherein the opening of the vertical incision extends from the widest surface of the core toward an interior of the core.

8. The vacuum insulation panel according to claim 6, wherein the core has a pair of opposed major surfaces and the vertical incision is provided on one of the opposed major surfaces of the core such that the opening extends from the one of the opposed major surfaces of the core toward an interior of the core.

9. The vacuum panel according to claim 6,
   wherein the core comprises an inorganic fiber layer with the vertical incision in a thickness direction and an inorganic fiber layer without the vertical incision, and the vertical incision passes through one side to the other side of the inorganic fiber layer with the vertical incision.

10. The vacuum insulation panel according to claim 6, wherein the getter material comprises a plurality of particles.

11. A vacuum insulation panel, comprising:
a core made of a material through which air can circulate,
a getter material which adsorbs moisture and gas from the core,
an inner film bag which accommodates the core and the getter material, and
an outer barrier bag which accommodates the inner film bag, wherein;
the core has only one vertical incision that linearly extends on the widest surface of the core and is cut to a depth and a length capable of holding the getter material,
the getter material is filled in the vertical incision, and
an opening of the vertical incision is, to prevent the getter material from getting out of the opening, narrowed by evacuating air from an interior of the inner film bag and compressing the inner film bag and the core is a state where the getter material is accommodated.

12. The vacuum insulation panel according to claim 11, wherein the opening of the vertical incision extends from the widest surface of the core toward an interior of the core.

13. The vacuum insulation panel according to claim 11, wherein the core has a pair of opposed major surfaces and the vertical incision is provided on one of the opposed major surfaces of the core such that the opening extends from the one of the opposed major surfaces of the core toward an interior of the core.

14. The vacuum insulation panel according to claim 11,
wherein the core comprises an inorganic fiber layer with the vertical incision in a thickness direction and an inorganic fiber layer without the vertical incision, and
the vertical incision passes through one side to the other side of the inorganic fiber layer with the vertical incision.

15. The vacuum insulation panel according to claim 11, wherein the getter material comprises a plurality of particles.

* * * * *